United States Patent
Muuttonen et al.

(10) Patent No.: US 10,415,621 B2
(45) Date of Patent: Sep. 17, 2019

(54) BLIND NUT, FASTENING ARRANGEMENT AND METHOD OF FASTENING

(71) Applicant: SANDVIK MINING AND CONSTRUCTION OY, Tampere (FI)

(72) Inventors: Timo Muuttonen, Tampere (FI); Timo Kela, Tampere (FI); Teemu Hietakari, Tampere (FI); Jari Kiili, Tampere (FI)

(73) Assignee: Sandvik Mining and Construction OY, Tamper (FI)

( * ) Notice: Subject to any disclaimer, the term of this patent is extended or adjusted under 35 U.S.C. 154(b) by 263 days.

(21) Appl. No.: 15/366,994

(22) Filed: Dec. 1, 2016

(65) Prior Publication Data

US 2017/0159695 A1    Jun. 8, 2017

(30) Foreign Application Priority Data

Dec. 2, 2015 (EP) .................................... 15197673

(51) Int. Cl.
| | |
|---|---|
| *F16B 37/00* | (2006.01) |
| *F16B 5/02* | (2006.01) |
| *F16B 37/04* | (2006.01) |
| *F16B 37/12* | (2006.01) |

(52) U.S. Cl.
CPC .............. F16B 37/00 (2013.01); F16B 5/02 (2013.01); F16B 37/041 (2013.01); *F16B 37/122* (2013.01); *F16B 2037/007* (2013.01)

(58) Field of Classification Search
CPC .......... F16B 5/02; F16B 23/00; F16B 33/004; F16B 37/00; F16B 37/041; F16B 37/122; F16B 43/001; F16B 2037/007

USPC ...................... 411/353, 371.1, 427, 429, 542
See application file for complete search history.

(56) References Cited

U.S. PATENT DOCUMENTS

| | | | | |
|---|---|---|---|---|
| 1,778,576 | A * | 10/1930 | Walker | ...................... B25B 1/24 269/245 |
| 3,534,797 | A | 10/1970 | Reinhard et al. | |
| 3,686,914 | A * | 8/1972 | Powsey | ............... B25B 27/0007 411/34 |
| 3,827,131 | A * | 8/1974 | Coltrin | ...................... B25B 7/02 227/144 |
| 4,364,346 | A | 12/1982 | Shiohara | |
| 4,897,008 | A * | 1/1990 | Parks | .................... B25B 13/065 411/431 |
| 5,112,176 | A * | 5/1992 | McCauley | ............ F16B 41/005 411/432 |
| 5,266,258 | A * | 11/1993 | Martin | .................... B29C 65/44 264/249 |
| 5,360,304 | A * | 11/1994 | Notaro | ................ F16B 23/0061 411/377 |

(Continued)

FOREIGN PATENT DOCUMENTS

| | | |
|---|---|---|
| DE | 4000209 A1 | 7/1991 |
| EP | 2873489 A1 | 5/2015 |

(Continued)

*Primary Examiner* — Roberta S Delisle
(74) *Attorney, Agent, or Firm* — Corinne R. Gorski

(57) ABSTRACT

The present disclosure relates to a blind nut, a fastening arrangement and further to a method of fastening. The blind nut includes a cylindrical outer surface portion provided with one or more sealing elements. The sealing elements of the blind nut may seal against a cylindrical inner surface of a nut space inside which the blind nut is configured to penetrate when being tightened.

12 Claims, 4 Drawing Sheets

(56) References Cited

U.S. PATENT DOCUMENTS

| | | | | |
|---|---|---|---|---|
| 6,322,308 B1* | 11/2001 | Grant | ............... | E05B 73/0076 |
| | | | | 411/372.6 |
| 6,732,814 B2 | 5/2004 | Heinonen et al. | | |
| 7,445,414 B1* | 11/2008 | Notaro | ............... | F16B 23/0007 |
| | | | | 411/432 |
| 8,985,925 B2* | 3/2015 | Lan | ............... | F16B 33/004 |
| | | | | 411/180 |
| 2008/0166202 A1* | 7/2008 | Dunlap | ............... | F16B 37/00 |
| | | | | 411/353 |
| 2010/0047037 A1 | 2/2010 | Ishida et al. | | |
| 2010/0143074 A1 | 6/2010 | Sumiya et al. | | |
| 2011/0220421 A1 | 9/2011 | Muuttonen et al. | | |
| 2013/0031765 A1 | 2/2013 | Chang-Feng | | |
| 2013/0034403 A1 | 2/2013 | Lan | | |

FOREIGN PATENT DOCUMENTS

| | | | |
|---|---|---|---|
| FR | 2693774 B1 | 10/1994 | |
| JP | S59171212 U | 6/1987 | |
| JP | H08145038 A | 6/1996 | |
| JP | H09068057 A | 3/1997 | |
| JP | 3091796 U | 2/2003 | |
| JP | 2008223873 A | 9/2008 | |
| JP | 2009138843 A | 6/2009 | |
| WO | 2008066031 A1 | 6/2008 | |
| WO | 2010058072 A | 5/2010 | |

* cited by examiner

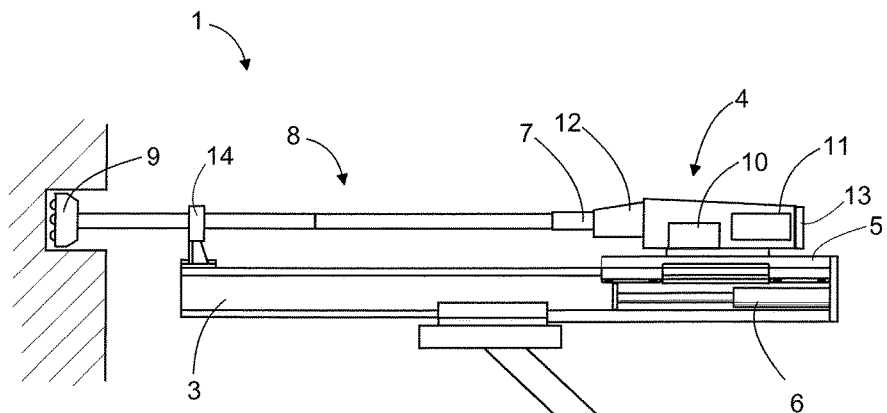
FIG. 1
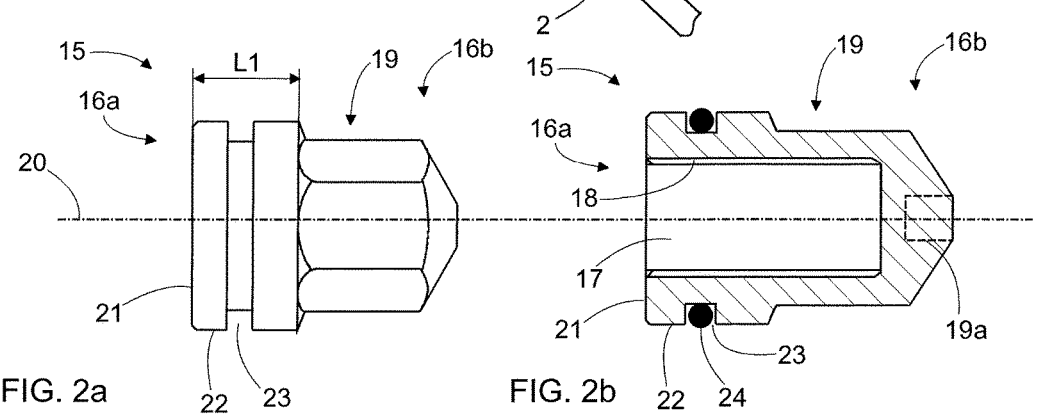
FIG. 2a
FIG. 2b
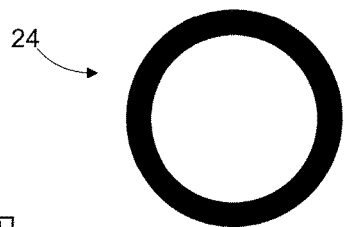
FIG. 2c
FIG. 3

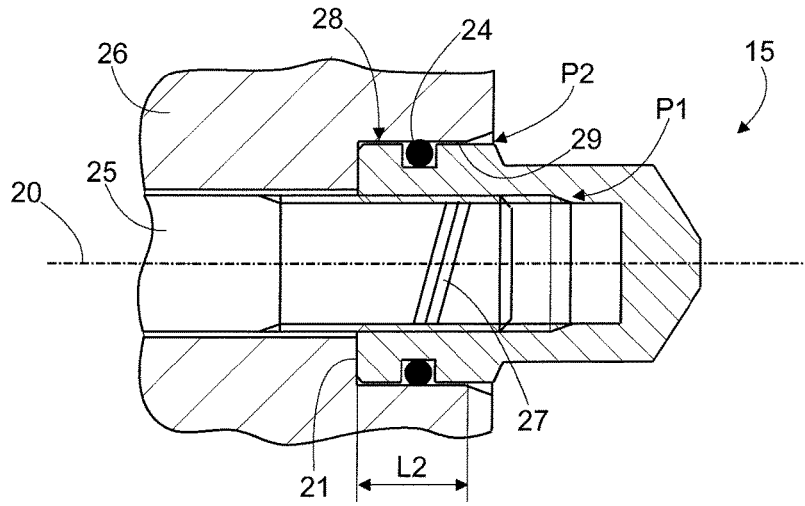

FIG. 4

```
Fastening arrangement
├─ First and second machine elements with mating fastening surfaces
├─ Screw joint connecting the machine elements
│   ├─ Fastening screw
│   ├─ Blind nut with sealing means
│   └─ Nut space providing mating sealing surface
├─ Fastening screw is pin bolt one end of which is provided with blind nut and another end being screwed to threaded fastening hole
├─ Fastening screw is headless bolt provided with blind nuts at both ends
└─ Fastening screw is conventional bolt with bolt head at one end and blind nut at another end
    └─ Bolt head and blind nut both provided with sealing means and being sealed against sealing surfaces of nut spaces surrounding bolt head and blind nut
```

FIG. 5

Fastening method utilizing screw fastening

Arranging fastening surfaces of machine elements facing towards each other

Arranging fastening screw to penetrate trough one or more through holes of machine elements Screwing blind nut to free end of fastening screw Using blind nuts provided with sealing means on outer circumference of blind nut Receiving bling nut at least partly inside nut space formed to outer surface of machine element Sealing blind nut with sealing means against inner surface of nut space Enabling sealaing regadless of tightening force of screw joint Utilizing the method for fastening body parts or modules of rock drilling machine, especially for mounting rock drilling machine or its parts

FIG. 9

BLIND NUT, FASTENING ARRANGEMENT AND METHOD OF FASTENING

RELATED APPLICATION DATA

This application claims priority under 35 U.S.C. § 119 to EP Patent Application No. 15197673.5, filed on Dec. 2, 2015, which the entirety thereof is incorporated herein by reference.

TECHNICAL FIELD

The present disclosure relates to a blind nut, which may be screwed to a fastening screw in order to provide a screw joint. One end of the blind nut is closed and the opposite end is open, whereby it may receive a free end of the fastening screw. The blind nut further includes turning surfaces in order to transmit turning torque to the blind nut for tightening and loosening the screw joint. The disclosure further relates to a fastening arrangement and a method of fastening.

BACKGROUND

Screw joints are used for fastening machine parts and elements together. In harsh circumstances moisture and dirt may penetrate along fastening screws inside machines and cause damage. Therefore blind nuts provided with closed ends are used in rock drilling rigs and mine vehicles operating in mines and work sites wherein working conditions are difficult. However, the present fastening arrangements have shown to contain some problems.

SUMMARY

To overcome the above disadvantages, the present disclosure is directed to provide a novel and improved blind nut, fastening arrangement and method for mounting.

According to a first aspect, the blind nut is provided with at least one sealing element. The sealing element is thereby integrated to be part of the blind nut. Further, the at least one sealing element is located on an outer circumference of the blind nut. Thus, an outer surface of the blind nut comprises at least one cylindrical outer surface portion, which is provided with the sealing element.

The direction of the sealing element is transverse relative to longitudinal axis of the blind nut. The sealing element surrounds periphery of the outer surface of the blind nut. Then, the sealing element may seal an annular gap between the blind nut and surfaces surrounding the blind nut.

The blind nut is a separate and distinct piece relative to machine elements being mounted. In other words, the blind nut is not fastened to the machine elements but may be screwed detachably to a fastening bolt. Thereby, the blind nut is an easily changeable component. The blind nut is screwed to the fastening bolt by turning the blind nut relative to the fastening bolt, and not vice versa.

Accordingly, the sealing arrangement and the blind nut prevent dirt and moisture to penetrate into one or more joints between machine elements through fastening holes made for the fastening screws. Thanks to the improved sealing feature provided by the blind nut, wear may be decreased. Then, service life of the machine elements and their fastening surfaces may be longer and failures may be prevented. An additional benefit is that the use of the blind nut is easy and the blind nut does not hamper in any way mounting and dismounting of the machine elements. Thus, the disclosed blind nut offers a relatively inexpensive and convenient solution for the fastening and sealing problems. Further, the disclosed blind nut may be implemented versatilely in many different fastening arrangements facing a need for providing dirt and moisture proof fastening.

According to an embodiment, the sealing element of the blind nut is made of compressible elastic material. Thus, the sealing element may of rubber or polymer material, for example.

According to an embodiment, the cylindrical outer surface portion of the blind nut includes at least one seal groove, which is provided with a ring-shaped seal. The seal groove provides support for the seal element and ensures that the sealing element remains correctly positioned. The sealing element is also easy to mount to the seal groove. The sealing element may be a piece made in a separate phase, or alternatively, the sealing element may be formed directly on the seal groove.

According to an embodiment, the cylindrical outer surface portion of the blind nut comprises at least one seal groove, which is provided with an O-ring. The O-ring is a ring-shaped sealing element. The O-rig has a simple structure, is easy to mount and change, and is inexpensive too.

According to an embodiment, the sealing element is located closer to the open end of the blind nut than the closed end. The cylindrical outer surface portion of the blind nut extends in a longitudinal direction of the blind nut from the open first end to at least longitudinal middle point of the blind nut. The position of the sealing element is closer the open first end than the middle point. When the sealing element is arranged closer to the open first end, it is easier to arrange counter surfaces for the sealing element. The counter surfaces serve as sealing surfaces against which the sealing element settles.

According to an embodiment, the blind nut includes only one single sealing element and is located at the cylindrical outer surface portion. The sealing element locating on the outer circumference is sufficient to provide proper sealing so that no other seals are needed. Thereby, the sealing solution has a simple structure, is easy to use and it is also inexpensive.

According to an embodiment, at least one machine element of the fastening arrangement is provided with a nut space at the fastening screw so that the blind nut and the nut space may act in co-operation. The nut space opens towards an outer surface side of the machine part or element and allows a front part of the blind nut to enter inside the nut space. Relative dimensions of the blind nut and the nut space are dimensioned so that the nut and the receiving space are compatible. The nut space may be formed directly to a body of the machine element by means of chip removing machining, for example.

The nut space and a fastening hole made for a fastening screw have a longitudinal axis, which are arranged to be in alignment so that the blind nut and its sealing positions properly inside the nut space. Thus, the sealing element seals an annular gap between an inner surface of the nut space and an outer surface of a body of the blind nut. However, depending on material and dimensions of the sealing element, some misalignment between the mating elements may be tolerated.

According to an embodiment, the solution is in accordance with the previous embodiment and further includes a feature that the blind nut is only partly inside the nut space. Then, part of the axial length of the blind nut is outside the nut space and that particular part of the blind nut may have the turning surfaces allowing transmitting turning movement to the blind nut. The blind nut may be predominantly visible when being mounted.

According to an embodiment, the blind nut is rotatable relative to the machine element being fastened by means of the blind nut.

According to an embodiment, lateral surfaces of the blind nut include the turning surfaces for transmitting the turning movement and torque for screwing the blind nut.

According to an embodiment, the fastening screw is a pin bolt and one end of the pin bolt is provided with a blind nut, which is in accordance with the disclosed solution. A first end of the pin bolt is fastened to a threaded fastening opening of the first machine element. A second end of the fastening screw extends to the outer surface side of the second machine element and is provided with the blind nut. On the outer surface side of the second machine element is a nut space inside which the blind nut may penetrate at least partly when being tightened to the fastening screw. The sealing element of the blind nut is set against a sealing surface of the nut space and constitutes a sealing together with the nut space. Thus, an inner circumference of the nut space serves as a sealing surface.

According to an embodiment, the fastening screw is a provided with an integrated bolt head at one end and a blind nut at the opposite end. The blind nut is in accordance with the disclosed solution. The fastening screw is arranged to pass through matching through holes of the first machine element and the second machine element, whereby both ends of the fastening screw extend to outer surface sides of the machine elements. A first end of the fastening screw extends to the outer surface side of the first machine element and is provided with the bolt head comprising turning surfaces. A second end of the fastening screw extends to the outer surface side of the second machine element and is provided with the blind nut. On the outer surface side of the second machine element is a nut space inside which the blind nut may penetrate at least partly when being tightened to the fastening screw. The sealing element of the blind nut is set against a sealing surface of the nut space and constitutes a sealing together with the nut space. Thus, an inner circumference of the nut space serves as a sealing surface.

An additional feature for the previous embodiment is that the integrated bolt head of the fastening bolt also comprises at least one sealing element on an outer periphery of the bolt head. Then, the first machine element may comprise a second nut space on an outer surface of the machine element in order to receive the bolt head at least partly and to provide a sealing surface for the sealing element of the bolt head. The bolt head of the fastening screw may include a cylindrical portion and the sealing element may be located at the cylindrical portion. The cylindrical portion may have a seal groove for the sealing element and the sealing element may include the features disclosed herein.

According to an embodiment, the fastening screw is a headless bolt provided with two blind nuts. Thus, both ends of the fastening screw are furnished with blind nuts, which are in accordance with the disclosed solution. The fastening screw is arranged to pass through matching through holes of the first machine element and the second machine element, whereby both ends of the fastening screw extend to outer surface sides of the connected machine elements. Two separate blind nuts are screwed to the opposing free ends of the headless bolt. At the through holes are nut spaces on outer surface sides of the connected machine elements, whereby the blind nuts are sealed against sealing surfaces of the nut spaces at both ends of the fastening screw.

According to an embodiment, the sealing between the blind nut and the nut space is independent of fastening force generated by the fastening screw and the blind nut. This feature has basis in that the cylindrical inner surface of the nut space, which serves as the sealing surface, has an axial dimension and is in alignment with the fastening screw. These features make it possible for the sealing element of the blind nut to slide axially along the sealing surface of the nut space during relative movement between the blind nut and the nut space. In other words, the sealing between the blind nut and the nut space is already generated when the sealing element penetrates inside the nut space. Due to this embodiment, sealing properties are not reduced even if the fastening is loosened for some reason. On the other hand, the disclosed fastening arrangement may be implemented in situations where a fastening screw needs to be loosened for adjustment purposes without allowing moisture and dirt to penetrate inside the adjusted structure.

According to an embodiment, the disclosed blind nut, fastening arrangement and the fastening method are intended for a rock drilling rig, and especially for a rock drilling machine of the rock drilling rig. Then, the first machine element and the second machine element to be connected by means of the disclosed screw joint are body parts, modules or devices of the rock drilling machine.

The body part of the rock drilling machine may include a gear body part or module and an impact body part of module, which body parts or modules are connected against each other. The blind nuts may also be used for fastening a flushing housing to a front part of the drilling machine, as well as for fastening a rear cover to a rear end of the drilling machine. Alternatively, or in addition to, the disclosed solution may be used for fastening the rock drilling machine or one of its body parts of modules to a support flange or corresponding support element of a carriage.

Further, the disclosed solution may be utilized in a drilling unit of the rock drilling rig for fastening any other components, devices or modules. In all of the mentioned situations there exists a need for protecting the fastened machine elements from rock material and flushing fluid spreading to the surrounding during the drilling operation.

The foregoing summary, as well as the following detailed description of the embodiments, will be better understood when read in conjunction with the appended drawings. It should be understood that the embodiments depicted are not limited to the precise arrangements and instrumentalities shown. The above-disclosed embodiments may be combined to form suitable solutions provided with necessary features disclosed.

BRIEF DESCRIPTION OF THE DRAWINGS

FIG. 1 is a side view showing a drilling unit having a rock drilling machine arranged on a feed beam.

FIG. 2a is a schematic side view of a body of a blind nut without a sealing element.

FIG. 2b is a schematic and cross-sectional side view of a blind nut provided with a circumferential sealing.

FIG. 2c is schematic view of a ring shaped sealing element mountable to a seal groove of a blind nut.

FIG. 3 is a schematic diagram showing some features of a blind nut.

FIG. 4 is a schematic and cross-sectional side view of a fastening arrangement wherein a blind nut is received partly inside a nut space.

FIG. 5 is a schematic diagram showing some features of a fastening arrangement.

FIG. 9 is a schematic diagram showing some features of a fastening method.

For the sake of clarity, the figures show some embodiments of the disclosed solution in a simplified manner. In the figures, like reference numerals identify like elements.

DETAILED DESCRIPTION

Figure 6:
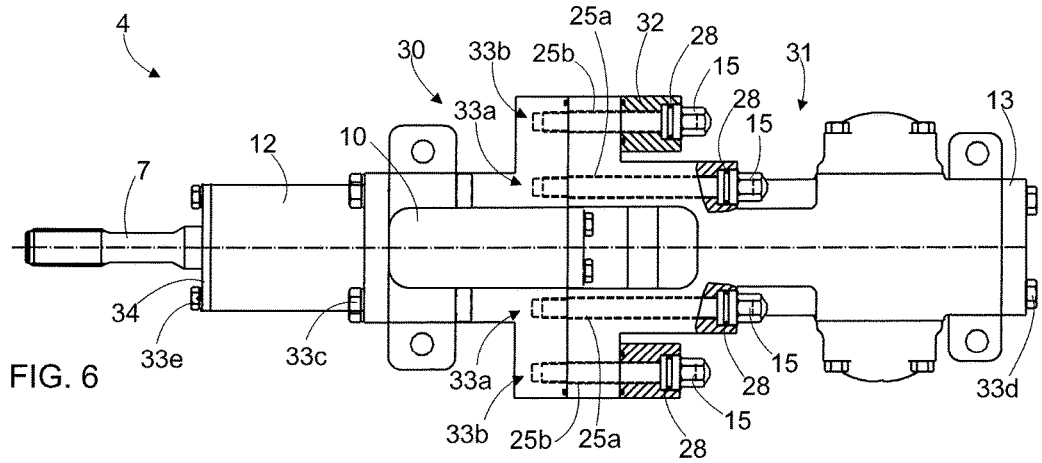
FIG. 6 is schematic and partial cross-sectional top view of a rock drilling machine wherein two modules or structures are connected to each other by means of pin bolts provided with sealed blind nuts.

FIG. 1 shows a rock drilling unit 1, which may be connected by means of a drilling boom 2 to a movable carrier of a rock drilling rig, which is not shown. The drilling unit 1 may include a feed beam 3 and a rock drilling machine 4 supported on it by a carriage 5. The rock drilling machine 4 may be moved in a drilling direction and reversing direction on the feed beam 3 by means of a feed device 6.

The rock drilling machine 4 include a shank 7 at a front end portion of the rock drilling machine 4 for connecting a drilling tool 8. The drilling tool 8 may have one or more drill rods and a drill bit 9 located at a distal end of the drilling tool 8. The rock drilling machine 4 further includes a rotating device 10 for rotating the shank 7 and the drilling tool 8 connected to the shank 7.

The rock drilling machine 4 may also be provided with a percussion device 11 having an impact element, such as a reciprocating percussion piston for generating impact pulses to the drilling tool 8. At a front end of the drilling machine 4 may be a flushing housing 12 for conveying flushing fluid to the drilling tool and further towards to the drill bit 9.

At a rear end of the drilling machine 4 may be a rear cover 13. Thus, the drilling machine 4 have several machine parts or modules which may be connected to each other, to a body of the rock drilling machine or to suitable support elements by means of screw joints utilizing the principles disclosed in this patent application.

Further, the drilling unit 1 may have screw joints in connection with the feed beam 3. At a front end of the feed beam may be a front support 14 and drilling tool handling devices which may also include screw joints wherein sealed blind nuts are beneficial because the joints are exposed to drilling cuttings and flushing fluid.

FIGS. 2a and 2b disclose a blind nut 15 having an open first end 16a and a closed second end 16b. Inside the blind nut 15 is a space 17 with threads 18. The space 17 opens towards the first end 16a. The second end 16b may be closed by means of the basic material of a body of the blind nut 15, or alternatively, the second end may be closed by means of a separate closing element, which may be a plastic plug, for example.

The blind nut 15 includes turning surfaces 19 in order to direct turning torque for tightening and loosening the blind nut. The turning surfaces 19 may have flattening portions on outer surface of the second end portion 16b, so that the blind nut may be turned around its longitudinal axis 20 by means of a fork or socket wrench. Alternatively, the turning surfaces may be located at an outermost end surface of the second end 16b and may include a recess 19a provided with surfaces for hexagon or torx wrench, for example. An outermost end of the first end 16a includes an axial support surface 21, which is configured to set against a machine element when the blind nut is mounted and properly tightened.

Further, an outer surface of the blind nut 15 includes a cylindrical outer surface portion 22, which may extend from the open first end 16a a distance L1 towards the second end portion 16b. As shown in FIGS. 2a and 2b, the cylindrical outer surface portion 22 extends approximately to a middle section of the blind nut 15 when seen in the longitudinal direction. However, the section 22 may extend further from the middle section towards the second end portion 16b, especially when the turning surfaces 19a locating at the distal end of the blind nut 15 are utilized.

At the cylindrical outer surface portion 22 there may be one or more seal grooves 23. Typically, one seal groove 23 is enough. The seal groove 23 may be furnished with a ring shaped sealing element 24, which may be an O-ring shown in FIG. 2c. The sealing element 24 may be a separate changeable piece, or alternatively it may be casted directly to the seal groove. In some cases the sealing element 24 may be arranged to surround the cylindrical outer surface portion 22 without the use of any seal groove 23. Then the seal 24 may be glued or cast on the portion 22, for example.

FIG. 3 shows basic features of the disclosed blind nut as discussed above in this patent application. FIG. 4 discloses a fastening arrangement including a fastening screw 25, a free end of which is provided with a sealed blind nut 15.

An axial support surface 21 is pressed against a machine element 26 when the blind nut 15 is tightened to threads 27 of the fastening screw 25. An outer surface side of the machine element 26 includes a nut space 28 inside which a front part of the blind nut 15 may penetrate. The nut space 28, the fastening screw 25 and the blind nut 15 are on the same axial line 20. An inner surface of the nut space 28 serves as a cylindrical sealing surface 29 against which a sealing element 24 of the blind nut 15 may seal. The sealing surface 29 has axial length L2 so that the sealing element 24 may slide inside the nut space 28 and provide sealing regardless of the tightening force of the screw joint.

The blind nut 15 prevents penetration of moisture and dirt via a fastening hole inside the structure of the machine element 26, at firstly, because the closed end of the blind nut prevents penetration along the fastening screw 25 and threads, and secondly, because the sealing element 24 and the nut space 28 prevent penetration along an outer periphery of the blind nut 15, as it is indicated by arrows P1 and P2.

FIG. 5 shows basic features of the disclosed fastening arrangement. described above. FIG. 6 shows a rock drilling machine 4 including a gear module 30 and an impact module 31, which are fastened to each other by means of pin bolts 25a and blind nuts 15. Thereby, the modules 30, 31 are at first connected to each other where after the combination is mounted to a support element 32 for connecting the rock drilling machine 4 to a cradle of a drilling unit. The fastening to the support element 32 may also be executed by means of pin bolts 25b and the blind nuts 15. The modules 30, 31 and the support element 32 are thereby machine elements which are fastened to each other by utilizing in their screw joints 33a and 33b principles of the disclosed fastening arrangement.

As can be noted in FIG. 6, the impact module 31 and the support element 32 include nut spaces 28 at their outer surface sides. In addition to the screw joints 33a and 33b, a screw joint 33c of a flushing housing and screw joints 33d and 33e of a rear cover 13 and front cover 34 may be provided with disclosed blind nuts.

Figure 7:
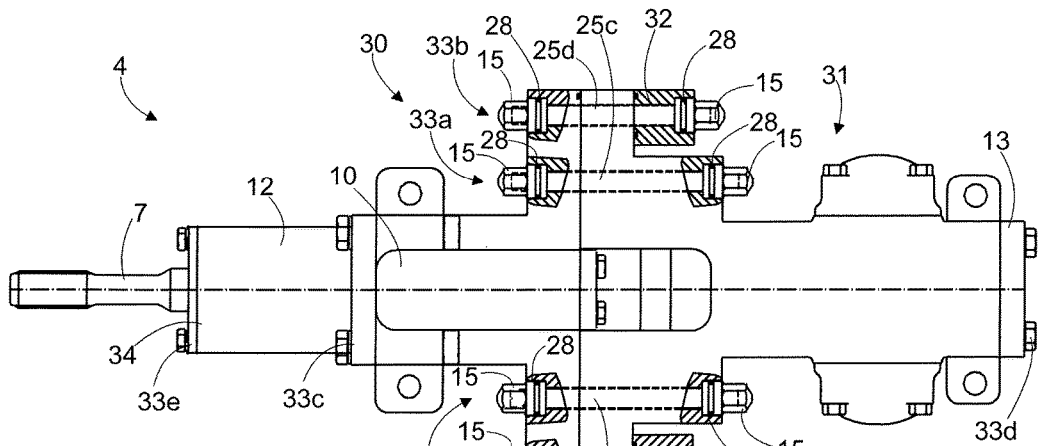
FIG. 7 is schematic and partial cross-sectional top view of a rock drilling machine wherein two modules or structures are connected to each other by means of headless bolts provided with sealed blind nuts at both ends of the bolts.

FIG. 7 shows a rock drilling machine 4 that has substantially the similar machine components and structure as the one disclosed in FIG. 6. However, the arrangement of FIG. 7 differs from the arrangement of FIG. 6 in that instead of pin bolts headless through bolts 25c and 25d are used in screw joints 33a and 33b. Both ends of the bolts 25c and 25d are provided with blind nuts 15, and further, outer surface sides of connected machine elements 30, 31 and 32 comprise nut spaces 28. In other words, at both end areas of the bolts 25c, 25d are spaces for receiving the nuts and providing cylindrical sealing surfaces.

Figure 8:
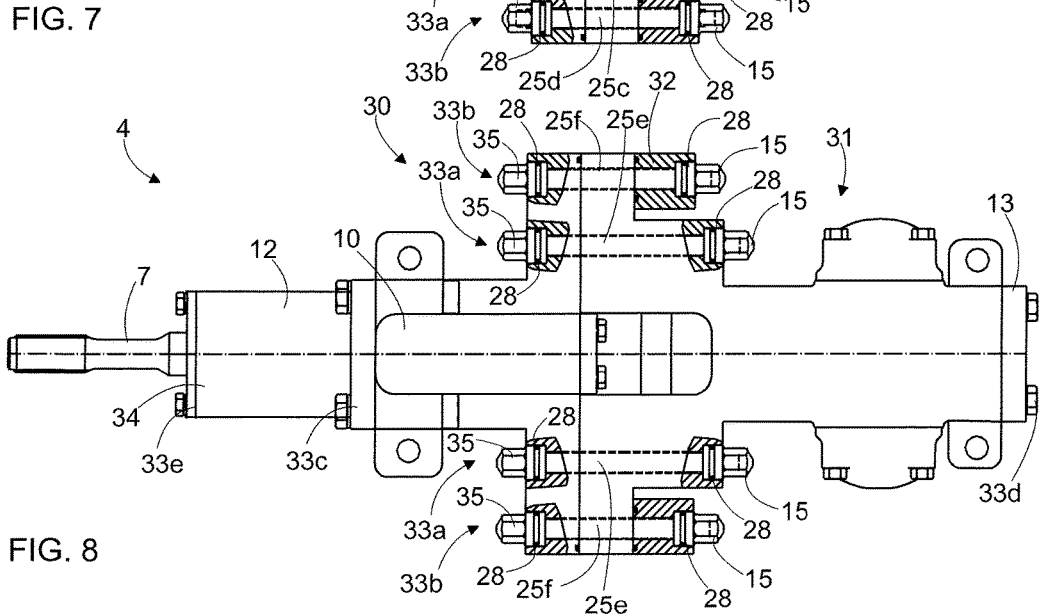
FIG. 8 is schematic and partial cross-sectional top view of a rock drilling machine wherein two modules or structures are connected to each other by means of fastening bolts with bolt heads and wherein blind nuts and bolt heads are sealed to nut spaces.

FIG. 8 shows a rock drilling machine 4, wherein a gearing module 30 and an impact module 31 are connected to each other by means of fastening bolts 25e with bolt heads 35, and further, the assembled structure is thereafter fastened to a support structure 32 by means of fastening bolts 25f also provided with bolt heads 35. Opposite ends of the bolts 25e, 25f are provided with blind nuts 15. The blind nuts 15, as well as the bolt heads 35, include sealing elements on their outer surfaces and are sealed to nut spaces 28.

It should be appreciated that the structure and the included machine components may deviate from the rock drilling machine disclosed in FIGS. 6-8, and further, that the rock drilling machine may be used for underground and surface drilling.

FIG. 9 shows basic features of the disclosed fastening method as described above.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A blind nut for a rock drilling machine of a rock drilling rig, the blind nut comprising:
    an open first end and a closed second end;
    a space with inside threads disposed at a portion of the first end arranged for fastening with a pin bolt of the rock drilling machine or one of its body parts or modules by screw joints;
    turning surfaces located at a portion of the second end arranged to direct turning torque for tightening and loosening the blind nut; and
    an axial support surface at the first end, wherein an outer surface of the blind nut includes at least one cylindrical outer surface portion, the at least one cylindrical outer surface portion having at least one sealing element, the sealing element surrounding the outer surface of the at least one cylindrical portion, the at least one cylindrical outer surface portion having at least one seal groove, the seal groove being provided with the at least one sealing element, which is a ring-shaped seal, wherein at least one the cylindrical outer surface portion extends in a longitudinal direction of the blind nut from the open first end to at least a longitudinal middle point of the blind nut, the sealing element being positioned closer to the first end than the middle point.

2. The blind nut as claimed in claim 1, wherein the sealing element is made of compressible elastic material.

3. The blind nut as claimed in claim 1, wherein the cylindrical outer surface portion includes at least one seal groove, the seal groove having a ring-shaped seal.

4. The blind nut as claimed in claim 3, wherein the ring-shaped seal is an O-ring.

5. The blind nut as claimed in claim 1, wherein the blind nut includes one single sealing element and is located at the cylindrical outer surface portion.

6. A fastening arrangement comprising:
    a first machine element provided with a first fastening surface;
    a second machine element provided with a second fastening surface;
    at least one fastening screw having an end portion provided with external threads and being arranged to extend from a side of the first machine element through a through hole of the second machine element, whereby the fastening screw extends to an outer surface side of the second machine element; and
    at least one blind nut located at the outer surface side of the second machine element and tightened to the fastening screw for pressing the first fastening surface and the second fastening surface towards each other, the outer surface side of the second machine element including a nut space at the through hole, the nut space having a cylindrical inner surface, wherein the blind nut is located at least partly inside the nut space and includes an open first end and a closed second end, a space with inside threads disposed at a portion of the first end, turning surfaces located at a portion of the second end arranged to direct turning torque for tightening and loosening the blind nut, and an axial support surface at the first end, wherein an outer surface of the blind nut includes at least one cylindrical outer surface portion, the cylindrical outer surface portion having at least one sealing element, the sealing element surrounding the outer surface of the cylindrical portion, the sealing element of the blind nut being configured to seal against the cylindrical inner surface of the nut space, whereby the cylindrical inner surface serves as a mating sealing surface for the sealing element, wherein the fastening screw is arranged to pass through matching through holes of the first machine element and the second machine element, whereby both ends of the fastening screw extend to outer surface sides of the machine elements, the fastening screw being a headless bolt having opposed ends, both of the opposed ends being provided with separate blind nuts and at the through holes nut spaces provided on outer surface sides of the both machine elements, wherein the blind nuts are sealed against the sealing surfaces of the nut spaces at both ends of the fastening screw.

7. The fastening arrangement as claimed in claim 6, wherein the fastening screw is a pin bolt, a first end of the pin bolt being fastened to a threaded fastening opening of the first machine element, a second end of the fastening screw extending to the outer surface side of the second machine element and being provided with the blind nut that is sealed against the sealing surface of the nut space.

8. The fastening arrangement as claimed in claim 6, wherein the fastening screw is arranged to pass through matching through holes of the first machine element and the second machine element, whereby both ends of the fastening screw extend to outer surface sides of the machine elements, a first end of the fastening screw extending to the outer surface side of the first machine element and being provided with an integrated bolt head including turning surfaces, and a second end of the fastening screw extending to the outer surface side of the second machine element and being provided with the blind nut, which is sealed against the sealing surface of the nut space.

9. The fastening arrangement as claimed in claim 6, wherein the cylindrical inner surface of the nut space serving as the sealing surface has an axial dimension allowing the sealing element of the blind nut to slide axially along the sealing surface of the nut space during relative movement between the blind nut and the nut space, whereby the sealing is independent of the fastening force generated by the fastening screw and the blind nut.

10. A fastening arrangement comprising:
a first machine element provided with a first fastening surface;
a second machine element provided with a second fastening surface, wherein the first machine element and the second machine element are body parts of a rock drilling machine;
at least one fastening screw having an end portion provided with external threads and being arranged to extend from a side of the first machine element through a through hole of the second machine element, whereby the fastening screw extends to an outer surface side of the second machine element; and
at least one blind nut located at the outer surface side of the second machine element and tightened to the fastening screw for pressing the first fastening surface and the second fastening surface towards each other, the outer surface side of the second machine element including a nut space at the through hole, the nut space having a cylindrical inner surface, wherein the blind nut is located at least partly inside the nut space and includes an open first end and a closed second end, a space with inside threads disposed at a portion of the first end, turning surfaces located at a portion of the second end arranged to direct turning torque for tightening and loosening the blind nut, and an axial support surface at the first end, wherein an outer surface of the at least one blind nut includes at least one cylindrical outer surface portion, the cylindrical outer surface portion having at least one sealing element, the at least one sealing element surrounding the outer surface of the cylindrical portion, the sealing element of the blind nut being configured to seal against the cylindrical inner surface of the nut space, whereby the cylindrical inner surface serves as a mating sealing surface for the sealing element.

11. The fastening arrangement as claimed in claim 10, wherein the first machine element is a body of a rotation module of the rock drilling machine and the second body part is a body of an impact module of the rock drilling machine.

12. The fastening arrangement as claimed in claim 10, wherein the first machine element is a body of the rock drilling machine; the second machine element is a carriage including an axial support flange; and the body of the rock drilling machine is fastened to the axial support flange by a screw joint having the at least one fastening screw and the at least one blind nut.

* * * * *